United States Patent
Borne-Pons

(10) Patent No.: US 12,253,860 B2
(45) Date of Patent: Mar. 18, 2025

(54) FAULT TOLERANT SYSTEMS FOR DISTRIBUTED SUPERVISION OF ROBOTS

(71) Applicant: Accenture Global Solutions Limited, Dublin 4 (IE)

(72) Inventor: Hugo Borne-Pons, Antibes (FR)

(73) Assignee: Accenture Global Solutions Limited, Dublin (IE)

( * ) Notice: Subject to any disclaimer, the term of this patent is extended or adjusted under 35 U.S.C. 154(b) by 490 days.

(21) Appl. No.: 17/096,789

(22) Filed: Nov. 12, 2020

(65) Prior Publication Data

US 2022/0147059 A1    May 12, 2022

(51) Int. Cl.
*G06Q 10/06*    (2023.01)
*G05D 1/00*    (2006.01)
*G05D 1/02*    (2020.01)
*G06Q 10/0631*    (2023.01)

(52) U.S. Cl.
CPC .......... *G05D 1/0295* (2013.01); *G06Q 10/06* (2013.01); *G06Q 10/0631* (2013.01); *G06Q 10/06311* (2013.01)

(58) Field of Classification Search
CPC .................................................. G05B 19/418
See application file for complete search history.

(56) References Cited

U.S. PATENT DOCUMENTS 10,845,822 B2 * 11/2020 Gariepy ................. G08G 1/202
11,360,757 B1 *  6/2022 Roy ........................ H04L 67/06
2014/0365258 A1 * 12/2014 Vestal ............ G06Q 10/063114
                                                            901/1

(Continued)

FOREIGN PATENT DOCUMENTS

JP    2021133469 A  *  9/2021

OTHER PUBLICATIONS

A. Singhal, P. Pallav, N. Kejriwal, S. Choudhury, S. Kumar and R. Sinha, "Managing a fleet of autonomous mobile robots (AMR) using cloud robotics platform," 2017 European Conference on Mobile Robots (ECMR), Paris, France, 2017, pp. 1-6, (Year: 2017).*

(Continued)

*Primary Examiner* — Jerry O'Connor
*Assistant Examiner* — Philip N Warner

(57) ABSTRACT

Embodiments provide systems, method, and computer-readable storage media for performing robotic tasks in a distributed and coordinated manner. A fleet of robots may use a sequence of messages to appoint supervisors for a set of tasks, where the supervisor robots are responsible for ensuring that their supervised tasks are completed by other robots of the fleet. The supervisors may solicit requests from other robots to perform available tasks and select a robot to perform an available task. Once a robot is appointed, the supervisor and the worker may use messaging sequences to monitor the status of the task and participating robots (e.g., the supervisor and the worker). The monitoring may enable the supervisor to detect a failed worker and enable other robots to detect a failed supervisor. When failed robots are detected, the robot(s) detecting the failure may initiate operations to take over the role(s) of the failed robots to ensure operation of the fleet of robots continues in a smooth manner and the tasks are completed efficiently.

17 Claims, 7 Drawing Sheets

(56) References Cited

U.S. PATENT DOCUMENTS

| | | | |
|---|---|---|---|
| 2017/0113348 A1* | 4/2017 | Monceaux | B25J 9/1661 |
| 2018/0035606 A1* | 2/2018 | Burdoucci | A01D 34/008 |
| 2018/0169865 A1* | 6/2018 | Kou | G06N 3/008 |
| 2018/0196404 A1* | 7/2018 | Stilwell | G05D 1/0295 |
| 2018/0326583 A1* | 11/2018 | Baroudi | B25J 9/1661 |
| 2018/0359319 A1* | 12/2018 | Hisano | G08B 13/19656 |
| 2019/0030719 A1* | 1/2019 | Dey | B25J 9/1682 |
| 2019/0204844 A1* | 7/2019 | Lau | G05D 1/0274 |
| 2020/0031578 A1* | 1/2020 | Lisso | B65G 1/1375 |
| 2020/0198122 A1* | 6/2020 | Newman | B25J 13/006 |
| 2020/0225673 A1* | 7/2020 | Ebrahimi Afrouzi | A47L 11/4011 |
| 2020/0262063 A1* | 8/2020 | Perera | B25J 9/1661 |
| 2021/0018912 A1* | 1/2021 | Dymesich | G06F 3/0482 |
| 2021/0065556 A1* | 3/2021 | Aijaz | G05D 1/0295 |
| 2021/0107153 A1* | 4/2021 | Poornachandran | G05B 19/042 |
| 2021/0132625 A1* | 5/2021 | Gillett | B64U 60/60 |
| 2021/0299875 A1* | 9/2021 | Iyer | G06Q 10/20 |
| 2022/0113703 A1* | 4/2022 | Singh | G06N 20/00 |
| 2022/0187847 A1* | 6/2022 | Cella | G06Q 10/06 |

OTHER PUBLICATIONS

Parker, L. E., "Alliance: An architecture for fault tolerant multi-robot cooperation," report, Feb. 1, 1995; Tennessee. (https://digital.library.unt.edu/ark:/67531/metadc675941/m1/1/: accessed Nov. 11, 2020), University of North Texas Libraries, UNT Digital Library, https://digital.library.unt.edu; crediting UNT Libraries Government Documents Department.

* cited by examiner

FAULT TOLERANT SYSTEMS FOR DISTRIBUTED SUPERVISION OF ROBOTS

TECHNICAL FIELD

The present application relates to robotic systems and more specifically to techniques for providing fault tolerant and distributed supervision of robots and robotic tasks.

BACKGROUND

Utilization of robots to perform tasks is becoming more prevalent. Presently, performance of robotic tasks may be performed under a centralized control architecture, where operation of the robots is controlled from a centralized location or device. Such systems require the robots to have network connectivity with the central control system, which prevents use of the robots to perform tasks in low connectivity environments. For example, some sites may not provide sufficient access to network connectivity to enable centralized control of a fleet of robots. Thus, use of centralized control systems may be suitable for some use cases where robots may be utilized to perform tasks but do not provide sufficient capabilities to address many use cases where robots may be deployed to perform tasks in a coordinated manner.

To overcome the limitations of centralized control systems, systems providing distributed control of robots to perform tasks have been proposed. As an example, the Alliance architecture provides a framework for addressing distributed task allocation (i.e., without centralized control). The Alliance architecture utilizes robot motivational behaviors to allocate tasks to robots, but suffers from several drawbacks when deployed in low connectivity environments and when certain robot behaviors occur. For example, while enabling decentralized performance and control of robotic tasks, the Alliance architecture is subject to disruption by adversarial and arbitrary behaviors. For example, robots operating in accordance with the Alliance architecture may become overly motivated and exhibit excessive motivation to perform tasks, which may result in the tasks being assigned to robots that are not optimal for performing the assigned tasks. Additionally, the Alliance architecture relies on implicit data to verify task performance, which can create situations where a task is assigned to a robot that has failed but the failure of the robot is not detected due to the reliance of the robots on implicit data to understand the state of the task performance. When this occurs it can create significant disruptions in the system and lead to the failure to complete tasks.

SUMMARY

The present application is directed to systems and methods for performing robotic tasks in a distributed and coordinated manner using a fleet of robots. The fleet of robots may be configured with a set of tasks to be performed in a distributed and coordinated manner. To facilitate coordination of the tasks performed by the fleet of robots, different ones of the robots may take on supervisor roles. A robot taking on a supervisor role may be responsible for selecting another robot of the fleet to perform one of the available tasks (i.e., a task that has not already been assigned to a robot). To assign tasks to the fleet, the supervisor may transmit a task available message to the fleet of robots. The task available message may include information that specifies the task to be performed, capabilities of robots required to perform the task, or other types of information.

The task available message may be received by other robots of the fleet and the robots may calculate a motivation score for performing the available task and may transmit a task proposal to the supervisor. The task proposals may be received by the supervisor and one of the robots associated with task proposals may be selected to perform the task. A task appointment may be transmitted to the robot that is selected to perform the task and the appointed robot may confirm the appointment by transmitting an acknowledgement to the supervisor. If the acknowledgement is not received by the supervisor or if no task proposals are received within a period of time, the supervisor may transmit a second task available message attempting to solicit additional robots to perform the task.

Once a robot is appointed to perform a task, the working robot and the supervisor robot may periodically exchange messages to verify that each other is alive. If a robot fails, the alive message signaling may be used to detect the failure, which may allow the supervisor to reassign the task to a different robot or allow another robot to assume the supervisor role, thereby ensuring that all tasks are assigned to a working robot capable of supervising the task or performing the task. The alive signaling messages may enable the fleet of robots to respond to behaviors that cause other types of robot control systems to fail and respond to those behaviors in a manner that ensures reliable performance of tasks and/or supervision of tasks. Moreover, the disclosed techniques for supervision and performance of robotic tasks are suitable for use in low connectivity environments where centralized control systems do not provide a viable solution for overseeing control of the fleet of robots.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed methods and apparatuses, reference should be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The systems and methods disclosed herein provide fault tolerant techniques for coordinating performance of tasks by a fleet of robots in a distributed and decentralized manner. A fleet of robots may be configured with a set of tasks to be completed. The robots may exchange messages to negotiate assignment of supervisor roles for each of the tasks included in the set of tasks. Once supervisor roles are determined, the supervisors may broadcast messages to the fleet of robots to inform the fleet of available tasks. Robots of the fleet may evaluate the available tasks to determine whether they possess appropriate capabilities to complete the tasks and transmit a task proposal to the appropriate supervisor for tasks the robot is suitable for performing. Information included in the task proposals may be used to select a robot for performing the task. Once the task is assigned to a robot, the supervisor may monitor a status of the worker robot and implement operations to allocate the task to a new robot if the supervisor detects a condition indicative of a failure of the worker. Additionally, the status of the supervisor may be monitored to detect a failure of the supervisor and if a failure of the supervisor is detected, another robot may attempt to take control of the supervisor role for one or more tasks. The above-described concepts enable the fleet of robots to continue operations in an efficient manner despite failures of robots as well as in environments where connectivity among the fleet of robots may be limited to ensure that tasks are completed in a timely manner.

Figure 1:
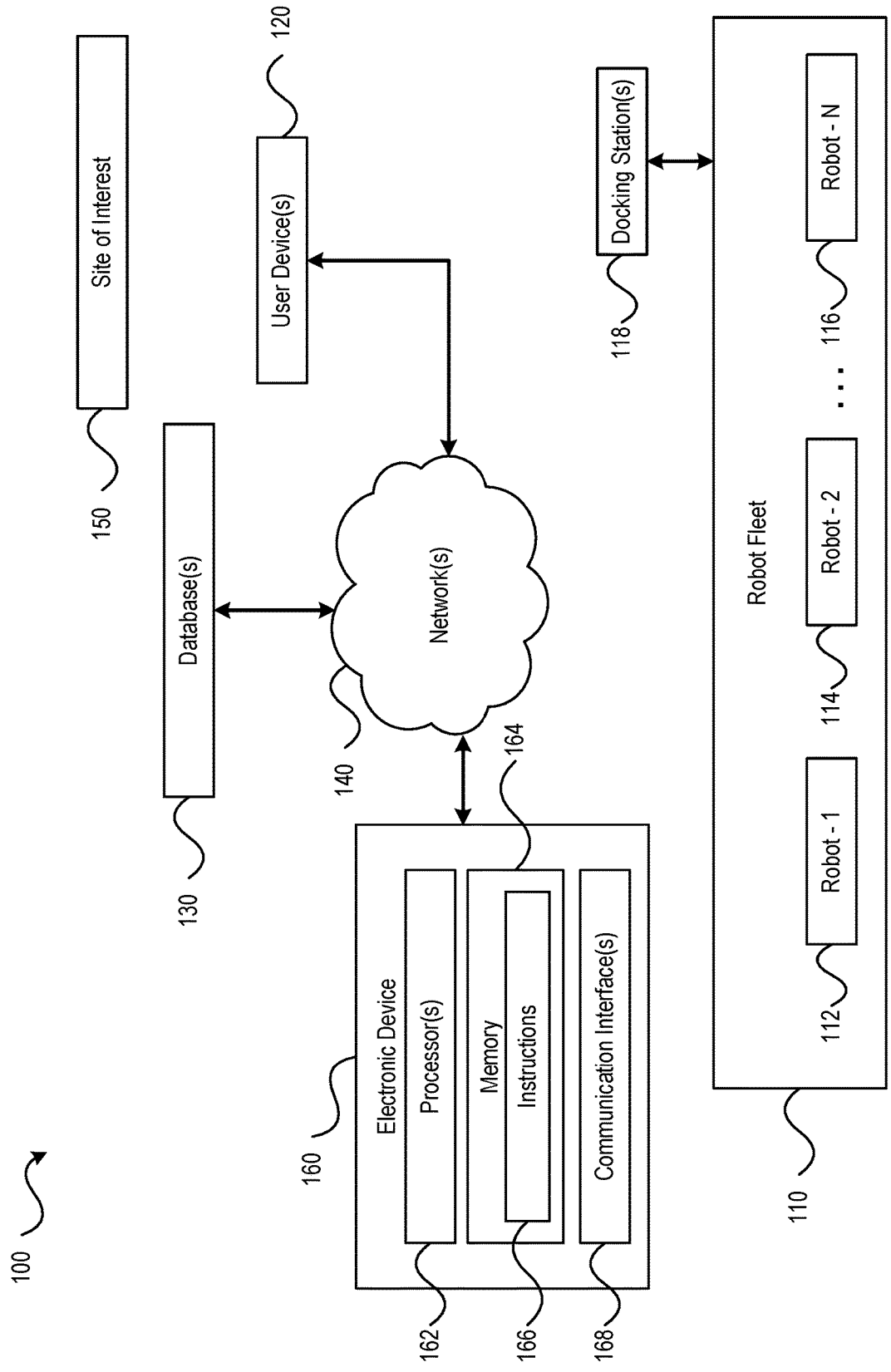
FIG. 1 is a block diagram of a system providing fault tolerant and distributed supervision of robot tasks in accordance with embodiments of the present disclosure.

Referring to FIG. 1, a block diagram of a system providing fault tolerant and distributed supervision of robot tasks in accordance with embodiments of the present disclosure is shown as a system 100. As shown in FIG. 1, the system 100 may include a fleet of robots 110, one or more user devices 120, one or more databases 130, and an electronic device 160. As shown in FIG. 1, the electronic device 160 may include one or more processors 162, a memory 164, and one or more communication interfaces 168. Each of the one or more processors 162 may be a central processing unit (CPU), a graphics processing unit (GPU), or other computing circuitry (e.g., a microcontroller, one or more application specific integrated circuits (ASICs), and the like) and may have one or more processing cores. The memory 164 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 164 may store instructions 166 that, when executed by the one or more processors 162, cause the one or more processors 162 to perform the operations described in connection with the electronic device 160. The one or more communication interfaces 168 may be configured to communicatively couple the electronic device 160 to the one or more networks 140 via wired or wireless communication links according to one or more communication protocols or standards.

Although not shown in FIG. 1 for simplicity of the drawing, the user device 120 may similarly include one or more processors, a memory, one or more communication interfaces, and one or more input/output (I/O) devices. Each of the one or more processors of the user device 120 may be a CPU, a GPU, or other computing circuitry (e.g., a microcontroller, one or more ASICs, and the like) and may have one or more processing cores. The memory of the user device 120 may include ROM devices, RAM devices, one or more HDDs, flash memory devices, SSDs, other devices configured to store data in a persistent or non-persistent state, or a combination of different memory devices. The memory of the user device 120 may store instructions that, when executed by the one or more processors of the user device 120, cause the one or more processors to perform the operations described in connection with the user device 120. The one or more communication interfaces of the user device 120 may be configured to communicatively couple the user device 120 to the one or more networks 140 via wired or wireless communication links according to one or more communication protocols or standards. The I/O devices of the user device 120 may include one or more display devices, a keyboard, a stylus, one or more touchscreens, a mouse, a trackpad, a camera, one or more speakers, haptic feedback devices, or other types of devices that enable a user to receive information from or provide information to the electronic device 160, such as to interact with a graphical user interface provided by the electronic device 160 to create a set of tasks that are to be executed by the fleet of robots 110, as described in more detail below.

The one or more networks 140 may include local area networks (LANs), wide area networks (WANs), wireless LANs (WLANs), wireless WANs, metropolitan area networks (MANs), cellular data networks, cellular voice networks, the Internet, and the like. The communication links provided via the one or more networks may include wired or wireless communication links established according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, a $3^{rd}$ Generation (3G) communication standard, a $4^{th}$ Generation (4G)/long term evolution (LTE) communication standard, a $5^{th}$ Generation (5G) communication standard, and the like). It is noted that while FIG. 1 illustrates the one or more networks 140 as being present, such illustration is not intended to be interpreted as indicating that connectivity to the one or more networks 140 is always available, especially with respect to the fleet of robots 110. For example, when constructing a building the walls and other structures and features of the construction site may create interference that prevents access to the one or more networks 140 by the fleet of robots 110 or other devices present at the construction site (or another type of site).

The fleet of robots 110 may include a plurality of robots 112, 114, 116 configured to autonomously perform various tasks in a distributed and coordinated manner, as described in more detail below. The plurality of robots may include N robots, where N>2. Each robot included in the fleet of robots 110 may be configured with different functionality and capabilities that enable the robots to perform different types and numbers of tasks. Exemplary features of the robots and their capabilities are described in more detail below with reference to FIG. 2. In an aspect, the system 100 may include one or more docking stations 118 that the fleet of robots 110 (or a portion thereof) may visit when not performing tasks or for other purposes (e.g., charging batteries, refueling, receiving service, etc.). In aspects, the one or more docking stations 118 may be located at a site of interest 150, where the site of interest corresponds to a location where the fleet of robots 110 are operating to perform various supervised tasks.

The robots of the fleet of robots 110 may each be associated with a robot identifier and a public key/private key pair. Each robot may be aware of the identities of the other robots in the fleet and may also store copies of the public keys of those other robots, while the private key may only be stored by the robot to which the private key belongs. The public/private key pair may be used to prove the identity of different robots during communication, such as when two or more robots are communicating with each other to delegate tasks, supervise tasks, monitor the status of tasks, or other types of communications that facilitate performance of tasks in a distributed manner in accordance with aspects of the present disclosure. For example, a robot may sign messages transmitted to other robots with its private key and may include the robot identifier so that other robots can then authenticate the identity of the author of the message using the public key associated with the robot identifier included in the message.

In addition to storing the identifiers and public keys of each robot in the fleet of robots 110 and the private key, each robot in the fleet of robots 110 may store information that identifies a set of tasks that the fleet of robots 110 are to complete. It is noted that while the set of tasks may be predetermined at the time the tasks are stored at the robots of the fleet of robots 110 the set of tasks is not static. Instead, storing the set of tasks to each robot prior to starting work on the tasks allows each robot to have an exhaustive initial list of existing tasks (i.e., at the beginning of the task execution). As described in more detail below, the initial set of tasks may be modified over time by one or more robots. Modification of the set of tasks may include adding new tasks to the set of tasks, cancelling existing tasks, splitting an existing task into two or more subtasks, or other types of modifications. As the task execution begins, it may be assumed that each robot of the fleet of robots maintains a non-exhaustive view of information exchanged between the other robots and that this knowledge will be used by each robot to make decision based on the task and information exchanges among the different robots. Exemplary decisions may include path planning, avoidance, re-sending communications, dividing tasks, creating new tasks, performing tasks, and the like.

Figure 2:
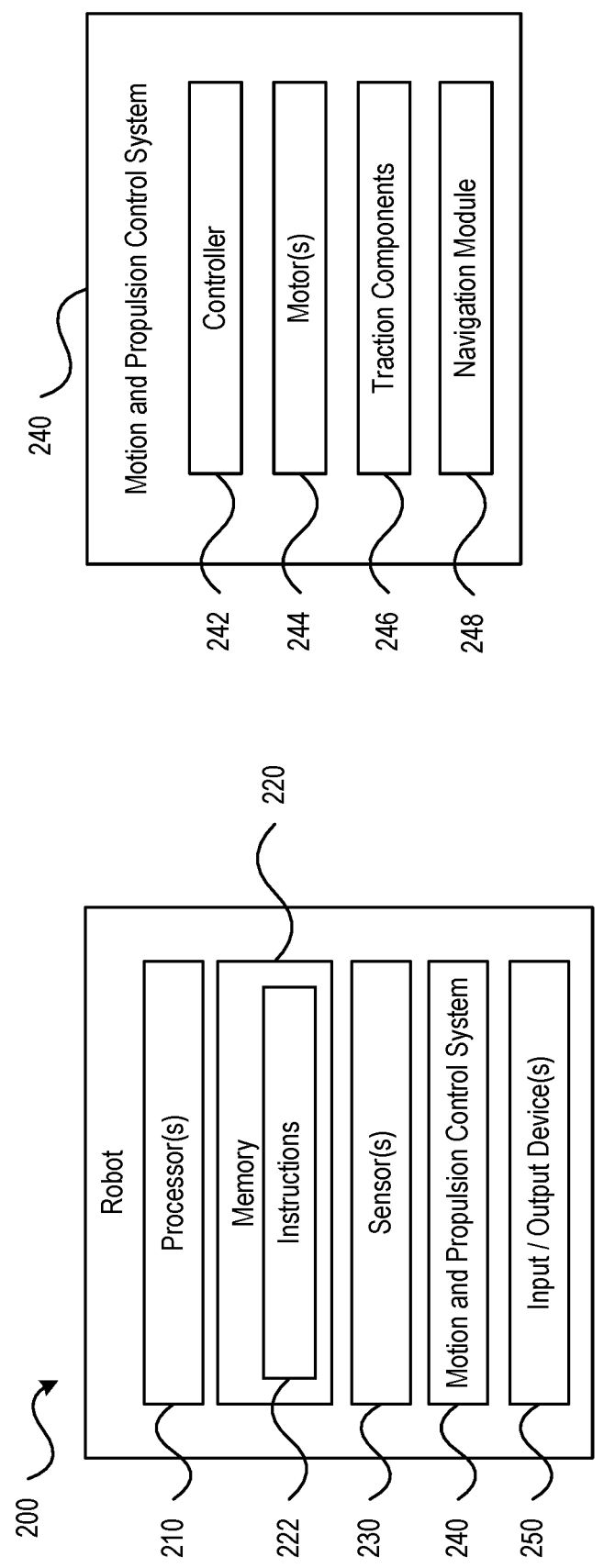
FIG. 2 is a block diagram of a robot configured to operate in accordance with embodiments of the present disclosure.

The fleet of robots 110 may be configured with different capabilities and functionality for performing the set of tasks. For example, and referring to FIG. 2, a block diagram of a robot configured to operate in accordance with embodiments of the present disclosure is shown as a robot 200. In an aspect, the robot 200 may be part of a fleet of robots, such as the fleet of robots 110 of FIG. 1, and include functionality for performing tasks in a distributed and coordinated manner using the techniques described herein. As shown in FIG. 2, the robot 200 (i.e., each of the robots included in the fleet of robots 110) may include one or more processors 210, a memory 220, one or more sensors 230, a motion and propulsion control system 240, and one or more input output (I/O) devices 250. The one or more processors 210 may include one or more microcontrollers, application specific integrated circuits (ASIC), field programmable gate arrays (FPGAs), central processing units (CPUs) having one or more processing cores, or other circuitry and logic configured to facilitate the operations of the robot 200 in accordance with aspects of the present disclosure. The memory 220 may include RAM, ROM, EEPROM, HDDs, SSDs, flash memory devices, or other memory devices configured to store instruction in a persistent or non-persistent state. Software configured to facilitate operations and functionality of the robot 200 may be stored in the memory as instructions 222 that, when executed by the one or more processors 210, cause the one or more processors to perform the operations described herein with respect to the robot 200, as described herein. Although not illustrated in FIG. 2 for simplicity of the drawing, robots of embodiments may include a power source, such as one or more batteries, a fuel-based fuel source (e.g., a combustion engine, etc.), or other type of infrastructure configured to provide operational power to the components of the robot described herein.

The one or more sensors 230 of the robot 200 may include accelerometers, gyroscopes, altimeters, radar, proximity sensors, global positioning system (GPS) devices, or other sensors and devices configured to provide information regarding operation of the robot 200 and its operating environment. The one or more sensors 230 may provide sensor data to the motion and propulsion control system 240, which may use at least a portion of the sensor data to control navigation and movement of the robot 200. For example, during navigation of the robot 200 sensor data provided by the proximity sensors may be utilized to detect obstacles in the path of travel of the robot 200. When an obstacle is encountered and detected by the robot 200, the navigation module 248 may reroute the robot 200 around the obstacle or may generate a new task requesting the obstacle be removed from the path of the robot 200. It is noted that exemplary techniques for creating tasks during operation are describe in more detail below.

The I/O devices 250 of the robot 200 may include communication interfaces (e.g., serial bus (USB) interfaces, Bluetooth communication interfaces, and the like) configured to communicatively couple the robot 200 to nearby devices (e.g., other robots, etc.), cameras (e.g., infrared cameras, video cameras, color image cameras, RGB-D cameras, etc.), radar systems, LiDAR systems, ultrasound sensors, temperature sensors, humidity sensors, or other types of devices that may capture information from the environment within which the robot 200 is operating. The communication interfaces may enable the robot to participate in bidirectional communication nearby robots, such as to broadcast available tasks, receive transmissions related to tasks from other robots, transmit status information associated with tasks the robot 200 is performing to other robots in the vicinity of the robot 200 or, when connectivity is available, to remote devices accessible via a network (e.g., the one or more networks 140 of FIG. 1).

As further illustrated in FIG. 2, the motion and propulsion control system 240 may include one or more controllers 242, one or more motors 244, traction components 246, and a navigation module 248. The one or more controllers 242 may be configured to control operations of the one or more motors 244 and the traction components 246 to navigate the robot 200 from a first location to a second location (e.g., a starting location to a location where the robot 200 is to perform a task). The traction components 246 may include wheels, belts or treads, rotor blades, or other components configured to allow the robot 200 to traverse a distance based on forces provided to the traction components 246 by the one or more motors 244. In an aspect, the one or more motors 244 may include one or more stepper motors configured to drive the traction components 246 in discrete increments. The discrete increments may correspond to unit of distance, which may be used to track the location of the robot 200 within a coordinate system and determine a distance traveled by the robot 200 within the coordinate system, which may help the robot 200 navigate in environments where tasks the robot 200 performs lack access to GPS or other types of navigation information systems. It is noted that the robot 200 may be deployed in different form factors, such as a ground based vehicle, an aircraft (e.g., quadcopter, etc.), a watercraft (e.g., a boat, a submarine, etc.), or other type of robot capable of performing tasks in accordance with the concepts disclosed herein.

Referring back to FIG. 1, the fleet of robots 110 may be deployed at a site of interest, such as the site of interest 150. The site of interest 150 may be a location where various activities may need to be monitored, such as a construction site, a mine, a stretch of road (or a railroad), a pipeline, an oil field, or other location. Often, the site of interest will be a location that may be referred to as a low connectivity environment, which means that network communication capabilities (e.g., Wi-Fi connectivity, cellular connectivity, or other types of wired or wireless communication infrastructure) are not readily accessible. The lack of network communication capabilities may be due to the lack of network communication infrastructure (e.g., base stations, cellular towers, etc.) being present at the site of interest 150, such as may occur over a geographic area where a pipeline is present. The lack of network communication capabilities may also be the result of characteristics of the site of interest 150 (e.g., concrete walls at a construction site, interference from machinery or other infrastructure of the site of interest, etc.), or other factors.

Due to the lack of or limited availability of network communication capabilities at the site of interest 150, it would be difficult to manage performance of the set of tasks by the fleet of robots 110 and monitor the performance of those tasks. Nevertheless, it is important that the system 100 be capable of monitoring the performance of the set of tasks and supervising the fleet of robots 110 to ensure that tasks are completed in a timely and verifiable manner. To that end, the robots of the fleet may be configured to operate as both workers (e.g., robots responsible for performing tasks of the set of tasks) and supervisors (e.g., monitoring performance of tasks of the set of tasks by other robots). Each robot of the fleet of robots 110 may act as a supervisor for one or more tasks performed by other robots (i.e., a robot cannot supervise a task for which the robot is responsible for performing the task) and tasks performed by any one of the robots of the fleet must be supervised by a robot that is different from the robots performing those tasks.

Figure 3:
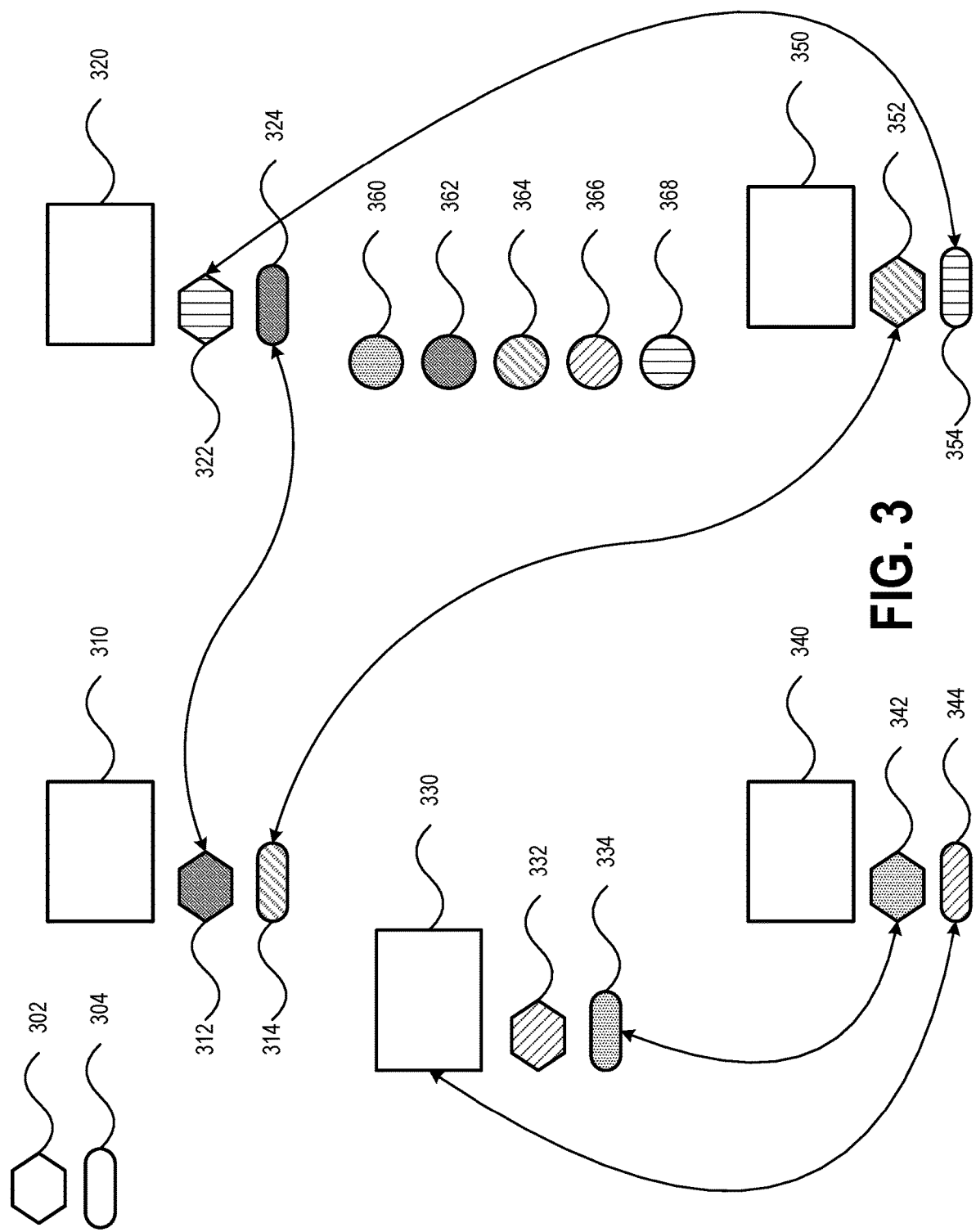
FIG. 3 is a block diagram illustrating aspects of performing tasks in an distributed and coordinated manner in accordance with aspects of the present disclosure.

The supervisor and worker roles described above are illustrated in FIG. 3, which is a block diagram illustrating aspects of performing tasks in a distributed and coordinated manner in accordance with aspects of the present disclosure. In FIG. 3, a fleet of robots (or a portion of the fleet of robots) is shown and includes robots 310, 320, 330, 340, 350. The plurality of robots 310, 320, 330, 340, 350 may be engaged in performing a plurality of tasks, including a first task 360, a second task 362, a third task 364, a fourth task 366, and a fifth task 368. The plurality of robots 310, 320, 330, 340, 350 have each assumed a supervisor role, indicated by icon 302, and a worker role, indicated by icon 304. As indicated by icon 312, the robot 310 may be the supervisor of task 362, which is being performed by robot 320, as indicated by icon 324. As indicated by icon 322, the robot 320 may be the supervisor of task 368, which is being performed by robot 350, as indicated by icon 354. As indicated by icon 332, the robot 330 may be the supervisor of task 366, which is being performed by robot 340, as indicated by icon 344. As indicated by icon 342, the robot 340 may be the supervisor of task 360, which is being performed by robot 330, as indicated by icon 334. As indicated by icon 352, the robot 350 may be the supervisor of task 364, which is being performed by robot 310, as indicated by icon 314. As shown in FIG. 3, each of the different robots 310, 320, 330, 340, 350 may function as a worker for one or more tasks and simultaneously serve as a supervisor with respect to a task performed by a different robot.

While FIG. 3 illustrates each of the robots 310, 320, 330, 340, 350 acting as a worker or a supervisor for only one task, it is to be understood that robots operating in accordance with aspects of the present disclosure may operate as supervisors for more than one task and may also operate as workers with respect to multiple tasks. The particular number of tasks performed by each of the robots may depend on the capabilities of the robots and the requirements of the tasks to be performed. For example, suppose that there are 8 tasks that require infrared images to be captured and there are 4 robots available for performing tasks, but only 2 of the robots may possess infrared cameras. In such an instance, these 2 robots may perform the 8 tasks requiring infrared images to be captured due to their capabilities to capture infrared images. Moreover, these 2 robots may split the 8 tasks evenly (e.g., each robot performs 4 of the infrared image capture tasks) or may perform a different number of tasks relative to each other (e.g., one robot performs 3 infrared image capture tasks and the other robot performs the remaining 5 infrared image capture tasks).

Referring back to FIG. 1, to facilitate coordinated performance of the set of tasks the fleet of robots 110 may be configured to use peer-to-peer (P2P) communication techniques, broadcast communication techniques, or other communication techniques to coordinate roles of the fleet of robots 110 as either supervisors (i.e., robots monitoring performance of tasks) or workers (i.e., robots performing tasks) with respect to the set of tasks. To aid in selection of roles, each task may include a plurality of parameters that each robot uses to evaluate whether it is suitable for performing a particular task. In an aspect, the plurality of parameters may include: a name parameter; a type parameter; a description parameter; a priority parameter; a required capabilities parameter; a motivation calculation (function) parameter; a minimal motivation parameter; a supervision procedure parameter; an execution procedure parameter; a completion requirements parameter; and a subtasks parameter.

The name parameter may identify a name of a corresponding task. The type parameter may identify a type of the task, such as a measurement task, a location task (e.g., verify the location of an item, a robot, etc.), a status task (e.g., a verify the status of task as complete, in progress, incomplete, etc.), or other types of tasks. It is noted that the types of available tasks will vary depending on the particular use case for which the fleet of robots 110 are deployed. To illustrate, task types may also include diagnostic type tasks (e.g., a robot may perform diagnostics on another robot to identify a cause of an error detected for the robot) and communication coverage type tasks (e.g., assigning robots to particular locations to maintain communication connectivity among the robots of the fleet, etc.). The description parameter may include a description of the task that is to be performed. In an aspect, the description may include a natural language description of the task, a coded description of the task (e.g., a sequence of alphanumeric characters or other information providing the robot with knowledge of the task to be performed), or other types of information descriptive of the task(s).

In an aspect, the priority parameter may indicate a priority of the corresponding task relative to other tasks of the set of tasks. For example, the tasks need to be completed in a particular order and the priority parameter may identify the order in which the tasks are to be completed, such as to identify one or more tasks that must be completed before the corresponding tasks can be completed. In an additional or alternative aspect, the task priority parameter may identify a priority of the task with respect to an importance of the corresponding task being completed (i.e., whether a task is important and must be completed or whether the task is optional). The priority parameter may be a score specified to a certain degree of granularity depending on the complexity of the use case and may be used to force robots to compute messages, information and handle tasks with higher priority scores before the rest. Priority for tasks may be calculated based on dependency levels, such as if a task needs to be done before starting other tasks, then it will have a high priority value. In an aspect, the priority of tasks may be used to detect "bottleneck tasks" and associate them with higher priorities. The priority parameters may also be used to generate a dependency graph that allows a user, such as a user operating the user device 120, to visualize the tasks being performed by the fleet of robots 110 and the order in which tasks are executed, which may enable remote monitoring of the fleet of robots 110 or allow users to replay the order in which the fleet of robots 110 executed the set of tasks, which may allow the user to modify how future sets of tasks initialized for execution by the fleet of robots 110.

The required capabilities parameter may specify one or more robot capabilities that are required to perform the corresponding task. For example, where a task requires the robot to capture images, the robot that accepts a worker role for that task should possess a camera suitable for capturing the images required by the task (e.g., a robot having an infrared camera may not be capable of capturing images for a task that requires an RGB-D camera capability and a robot having a camera suitable for capturing video and still images may not be suitable for capturing images for a task that requires infrared images). The motivation calculation (function) parameter may include a function that may be used by the robots to calculate their motivation scores for performing the corresponding task. As an illustrative example, a motivation score may be calculated via a function expressed as:

$$M(b,l,c,sn,tc)=(tc-tcN)\cdot a\cdot (b/b\ max+(l-l0)/l\ max+c/c\ max+sn/sn\ maxx),$$

where b is the battery level, l is the location of the robot, c is the CPU usage, sn is the number of supervision tasks already taken by the robot, and tc represents the robot's task capabilities. The minimal motivation parameter may specify a minimal motivation score that must be achieved in order for a robot to accept the worker role for the corresponding task. It is noted that the function illustrated above is provided for purposes of illustration, rather than by way of limitation and that other functions may be used to calculate a motivation score. Specifying a minimal motivation score may reduce the amount of communication or messages transmitted by the fleet of robots, such as allowing robots that are not suitable for performing a task (e.g., as a worker) to ignore that task and not transmit any messages attempting to assume the worker role for tasks the robot(s) is not suitable for performing. The supervision procedure parameter may specify actions that should be taken by a robot that accepts the supervisor role for the corresponding task, such as how to verify the task is completed successfully or other supervisory aspects of the task. The execution procedure parameter(s) may include information about how the task is to be performed. To illustrate, a supervisor execution procedure may specify the following parameters:

```
{
timeout: 1200,
keep_alive: 120,
method: "ping",
validation: "data",
handover: "partial"
}
```

The timeout parameter may specify a value used to detect a timeout condition, such as when a time period within which a task proposal should be received from at least one robot following transmission of a task available message. If no task proposal is received within the time period specified by the timeout parameter, the supervisor may detect a timeout condition and restart the process. The keep_alive parameter specifies a value for transmitting alive messages to robots being supervised (or for monitoring the status of other supervisors, as described with reference to FIG. 5). The method, validation, and handover parameters may specify processes (e.g., a ping process) to be performed, information used to perform aspects of the processes (e.g., data may be used to validate the ping process, such as an alive acknowledgment message), and whether the processes performed can be handed over to another robot (e.g., the handover parameter). It is noted that the exemplary parameters described above have been provided for purposes of illustration, rather than by way of limitation and that other parameters and parameter configurations may be utilized to configure aspects of robotic tasks depending on the particular use case involved.

The completion requirements parameter may specify conditions that may be used to evaluate whether the task was completed successfully. The subtasks parameter may optionally indicate any subtasks associated with the corresponding task. The subtasks may provide a mechanism for leveraging the motivation score of a robot towards a task in a manner that extends the results. To illustrate, subtasks may include tasks such as formatting, computation, or handover tasks for robots. In a use case involving 3D mapping tasks, a subtask may include compression of the 3D map (e.g., a point cloud, etc.), which may enable more efficient uploading of the 3D map data at a later time, such as when the robot returns to the one or more docking stations 118. It is noted that the exemplary task specification parameters described above have been provided for purposes of illustration, rather than by way of limitation and that embodiments of the present disclosure may utilize less parameters, more parameters, or different parameters than those described above.

In an aspect, the set of tasks may be configured by a user, such as a user operating the user device 120. In an aspect, the electronic device 160 may provide a graphical user interface that enables the user to configure the set of tasks, such as to create the initial tasks included in the set of tasks, configure the tasks specifications for each task, or other task initialization operations. In an aspect, the set of tasks created by the user may be stored in a database, such as the one or more databases 130 of FIG. 1. It is noted that while FIG. 1 illustrates the database 130 as being separate from the electronic device 160, the user device 120, and the fleet of robots 110, in some aspects, the database 130 or a portion thereof (e.g., a portion corresponding to a set of tasks to be performed) may be stored at one of these device, such as at the memory 164 of the electronic device 160, a memory of the user device 120, or a memory of the robots of the fleet of robots 110 (e.g., the memory 220 of FIG. 2). In an aspect, the configuration of the set of tasks may be created remotely such that a user located in one geographic location can create a set of tasks to be completed by the fleet of robots 110 that are at a disparate geographic location relative to the user. In such instances, the fleet of robots 110 may receive the initial set of tasks via the one or more networks 140. The downloading or reception of the initial set of tasks by the fleet of robots 110 may performed while in a location having access to the one or more networks 140, such as while the fleet of robots are docked at the one or more docking stations 118. It is noted that despite the ability to download or receive the initial set of tasks via the one or more networks 140, such disclosure should not be interpreted to mean that the fleet of robots are constantly connected to or in communication with the one or more networks 140. For example, the one or more docking stations 118 may be disposed at locations of the site of interest 150 where network communication with the one or more networks 140 is available, but while the fleet of robots are traversing various portions of the site of interest 150 to perform the set of tasks, the one or more networks 140 may not be available (e.g., due to interference caused by structures or other features present at the site of interest or for other reasons).

Figure 4:
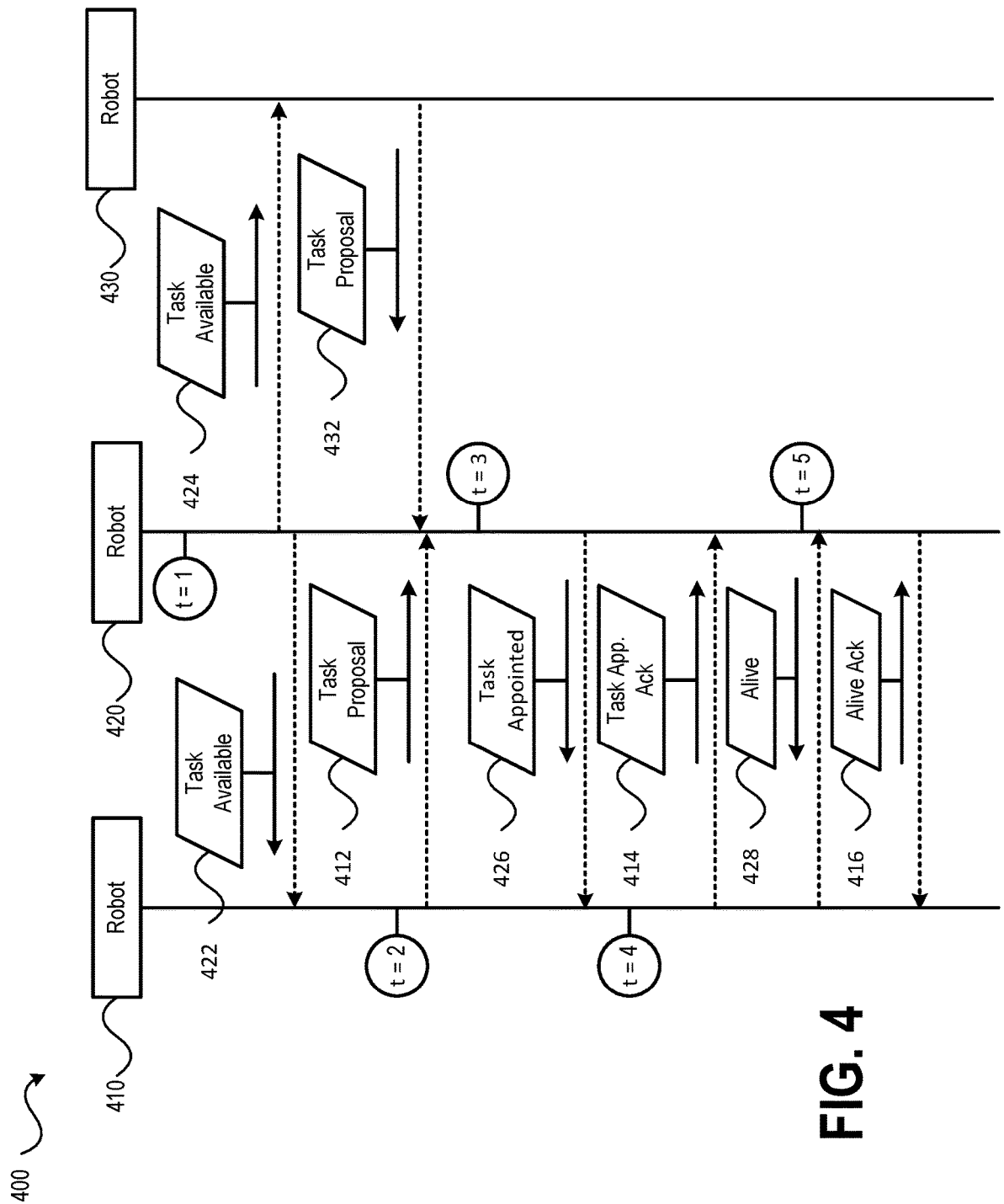
FIG. 4 is a ladder diagram illustrating an exemplary process for selecting supervisor and worker roles for the set of tasks in accordance with embodiments of the present disclosure.

Once the set of tasks is created and deployed to the fleet of robots 110, the fleet of robots 110 may begin a process of selecting supervisor and worker roles for each of the different robots of the fleet. Referring to FIG. 4, a ladder diagram illustrating an exemplary process for selecting supervisor and worker roles for the set of tasks is shown as a process 400. In FIG. 4, 3 robots are shown, including a robot 410, 420, 430. Each of the robots 410, 420, 430 may be configured as shown in FIG. 2 and may store a set of tasks, as described with reference to FIG. 1. At a first time (t=1), the robot 420 may determine that a task is available and may broadcast a task available message 422 to neighboring robot 410 and a task available message 424 to neighboring robot 430. In an aspect, the task available messages 422, 424 may be generated based at least in part on the specification associated with the task. In an aspect, task proposals may be transmitted to a subset of the fleet of robots, rather than all of the robots. For example, the robot 420 may transmit the task available messages 422, 424 to the robots 410, 430 based on a determination that the robots 410, 430 possess the capabilities required to perform the task. The ability to identify robots having capabilities to perform a task may be provided, at least in part, based on the knowledge that each robot has other robots included in the fleet of robots. Once the robots 410, 430 receive the task available messages 422, 424, respectively, the robots 410, 430 may analyze the parameters of the available task identified in the messages 422, 424 and utilize the motivation function to calculate their respective motivation for performing the available task. As described above, the motivation function may enable the robots to calculate a motivation score that indicates their ability to perform the function, where a higher motivation score may indicate that a robot is more well suited to perform the available task than another robot having a lower motivation score. In an aspect, the motivation score may also take into account information other than the capabilities of the robots. For example, the motivation score may take into account the number of tasks for which the robot has been assigned a worker role, which may indicate that the robot is busy (e.g., if the robot already has one or more tasks to perform) or idle (e.g., if the robot does not have a task to perform). Additionally, the motivation score may also take into account the proximity of the robots to the available task, where the motivation score may be higher when the robot is near the location where the task is to be performed and lower when the robot is farther away from the location where the task is to be performed.

After the robots 410, 430 calculate their motivation scores, they may respond to the task available messages by broadcasting (or unicasting) task proposal messages. For example, as shown in FIG. 4, at a time (t=2) subsequent to receiving the task available messages 422, 424, the robot 410 may transmit a task proposal message 412 and the robot 430 may transmit a task proposal message 432, where the task proposal messages 412, 432 may indicate the robots 410, 430 motivation score for performing the available task. At a time (t=3), the robot 420 may receive the task proposals 412, 432 and evaluate the contents of the proposals, such as to evaluate the motivation scores or other information included in the received task proposals. Based on the analysis of the task proposals 412, 432 received from the robots 410, 430, respectively, the robot 420 may select one of the robots to perform the task. For example, as shown in FIG. 4, the robot 420 may determine to assign the worker role to the robot 410 and transmit a task appointed message 426 to the robot 410. It is noted that since the robot 430 was not assigned the worker role no messages need be transmitted to the robot 430 in some embodiments. In other embodiments, the robot 420 may transmit a message to the robot 430 to indicate that the robot 430 was not assigned the worker role or the robot 420 may simply broadcast the task appointed message 426 so that any robot receiving the task appointment message that is not the robot 410 may determine that they are not assigned the worker role for that task. It is noted that transmitting messages to robots to confirm those robots were not assigned certain tasks may increase the amount of messages exchanged by the fleet of robots, which may be undesirable, and so in some embodiments no negative appointment messages (i.e., messages indicating a particular robot was not assigned a task) are transmitted.

The robot 410 may respond, at time (t=4), to the task appointed message 426, with a task appointment acknowledgement message 414. The task appointment acknowledgement message 414 may indicate that the robot 410 has accepted the worker role assigned by the robot 420. Once accepted, the robot 420 may be the supervisor and the robot 410 may be the worker for the task indicated in the task available messages 422, 424. It is noted that where the robot 410 takes too long to acknowledge the task appointment the supervisor robot 420 may transmit a new task available message and select a new robot to perform the task. As the supervisor, the robot 420 may be responsible for monitoring the status of the task that is to be performed by the robot 410. To facilitate monitoring of the task, the robot 420 may maintain a task status timer, which may be used to determine when to follow up with the robot 410 regarding the status of the task. The task status timer may be initialized or started when task appointment acknowledgement is received or at another time. For example, if it is expected that the robot 410 is going to immediately start the task, the timer may be started upon receiving the acknowledgement message and if it is expected that the task will not be started until an amount of time has elapsed, then the timer may be started at a later time. In an aspect, the timing for when to start the time may be based on the robot 420's knowledge of the set of tasks, such as any dependencies between different tasks, etc., since the robot 420 may have knowledge of the initial set of tasks, as described above. In still additional or alternative aspects, the robot 420 may be configured to follow up with the robot 410 regarding the status of the task without using a timer.

To follow up with the robot 410 and check on the status of the task assigned to the robot 410 by the robot 420, the robot 420 may transmit an alive message 428, at time (t=5). The alive message 428 may simply be a message asking the robot 410 to confirm the robot 410 is still operational (e.g., because it may be assumed that the task is going to be performed or has been performed as long as the robot 410 responds). As shown in FIG. 4, the robot 410 may receive the alive message 428 from the robot 420 and may respond by transmitting an alive acknowledgment message 416 to the robot 420. The alive acknowledgement message 416 may simply signify that the robot 410 is still operational or in some aspects may include additional information, such as a status of the task assigned to the robot 410 by the robot 420. As illustrated in FIG. 4, embodiments of the present disclosure provide a framework for allowing robots to perform decentralized and distributed assignment of tasks in a limited connectivity environment. Moreover, the message flows shown in FIG. 4 also provide mechanisms for monitoring the status of tasks or robots assigned to perform tasks (e.g., via the alive and alive acknowledgement messaging), which may allow systems involving performance of tasks in a distributed manner to more readily adapt and respond when outlier conditions occur, as described in more detail below.

It is noted that the task proposal messages transmitted by robots in accordance with the concepts disclosed herein may also indicate that a robot will not accept a task, or more specifically, will not accept a worker role for the task. For example, despite being capable of performing the task, the robot 430 may transmit a task proposal message 432 that indicates the robot 430 is not suitable for the task or will not accept a worker role for the task since the robot 430 may already have a worker role for a number of other tasks and accepting the worker role for the task indicated in task available message 424 may require the task to be performed in a timeframe that is not permitted by the other tasks for which the robot 430 is a worker. In still other aspects, a robot may accept a task despite being a worker for many other tasks and may seek to reassign one or more of its existing tasks.

Referring back to FIG. 1, once the tasks have been assigned (or at least a portion of the tasks have been assigned), the fleet of robots 110 may begin performing the tasks. One situation that causes existing systems to break down is the lack of connectivity as performance of tasks begins. For example, suppose that the robot 410 of FIG. 4 is performing 3 different tasks, one of which is the task assigned by the robot 420, and the robot 420 transmits an alive message to check on the robot 410, but the robot 410 is out of communication range of the robot 420. The robot 420 may not receive a response and may therefore be unable to verify the status of the task assigned to the robot 410. As the supervisor, the robot 420 may allow some status checks (e.g., alive messages) to go unanswered without inferring any negative implications with respect to the status of the robot 410. However, after a threshold number of status checks have gone unanswered, the robot 420 may determine that the robot 410 has failed (e.g., is no longer able to perform that task) and may transmit a new task available broadcast (i.e., transmit a new instance of the task available messages 422, 424 of FIG. 4) to robots that are within communication range of the robot 420.

The new candidates may then follow to process 400 of FIG. 4 and a new robot may be assigned that task that was previously assigned to the robot 410. In an aspect, the robots receiving the new task available message transmitted by the robot 420 may include a response from a robot that also responded to the previous task available message (e.g., the robot 430). When a past candidate is included in the robots responding to the new task available message, the robot 420 may then subtract the motivation scores of the task proposals received from past candidates from the amount of time that has elapsed since the prior response by the past candidate. This will bias the robot 420 towards selection of a new robot to perform the task based on new worker proposals, which may include task proposals received from the past candidates that may more accurately reflect those robots ability and motivation to perform the task at the time the new task availability messages are transmitted. It is noted that while selection of a new robot to perform a task that was previously assigned to another robot may create duplication of tasks, aspects of the present disclosure may be utilized in systems having a large number of robots and so redundancy of tasks should have a trivial effect on the overall completion of the set of tasks.

While the process 400 of FIG. 4 focuses on assignment of worker roles to robots, it is important to note that the supervisor roles may also be determined by the fleet of robots 110 in a dynamic and distributed manner. For example, each robot within the fleet of robots 110 may calculate a motivation score and patience score related to the supervision of every task known to the fleet of robots 110. For supervisor determinations, the motivation scores may represent an increasing the likeliness of a robot becoming the supervisor of a task and patience score may represent a minimum time before the robot tries to become the supervisor of the task.

The motivation and patience parameters may be calculated based on a variety of factors, including: remaining resources (e.g., bandwidth, CPU usage, battery power remaining, etc.), a current number of supervised tasks (e.g., current number of supervised tasks<a maximum number of allowed supervised tasks), task capabilities (i.e., a robot that has the appropriate capabilities to perform a task may have a lower motivation score than a robot that does not have capabilities to perform the task since it would be more beneficial to have a supervisor be a robot that cannot perform that task in order to have more robots available to perform the task), and current supervisor motivation score (e.g., a robot that has no tasks available or is not capable of performing available tasks may be more motivated to act as a supervisor than a robot that has many available tasks). Taking into account the remaining resources of the robot when calculating the motivation score may enable robots to conserve resources while still serving to contribute towards the completion of the set of tasks. For example, if the robot runs on batteries and the robot's batteries are running low (e.g., below a threshold charge amount, such as 20%, 15%, 10%, 5%, etc.) the robot may be more inclined to supervise tasks than attempt to become the worker assigned to the tasks since the battery power of the robot may not be sufficient to complete the task, which would result in another robot having to perform the task and would create waste. When the patience of a robot toward a task reaches zero, the robot will try to become the supervisor of the task. For example, suppose that a robot is initially not motivated to become a supervisor of a task because it has several tasks to perform and capabilities to perform other available tasks. That robot may initially have a low motivation score and may not become the supervisor. The robot may transmit its scores to other robots and may receive scores from the other robots. If there is no current supervisor or no other responses from other robots expressing a motivation for becoming the supervisor, the robot will claim the role and send a task supervisor appointed message to all robots with the robot's own motivation score. If there are simultaneous supervisor appointments for the same task, the highest motivation score will take the supervisor role.

Figure 5:
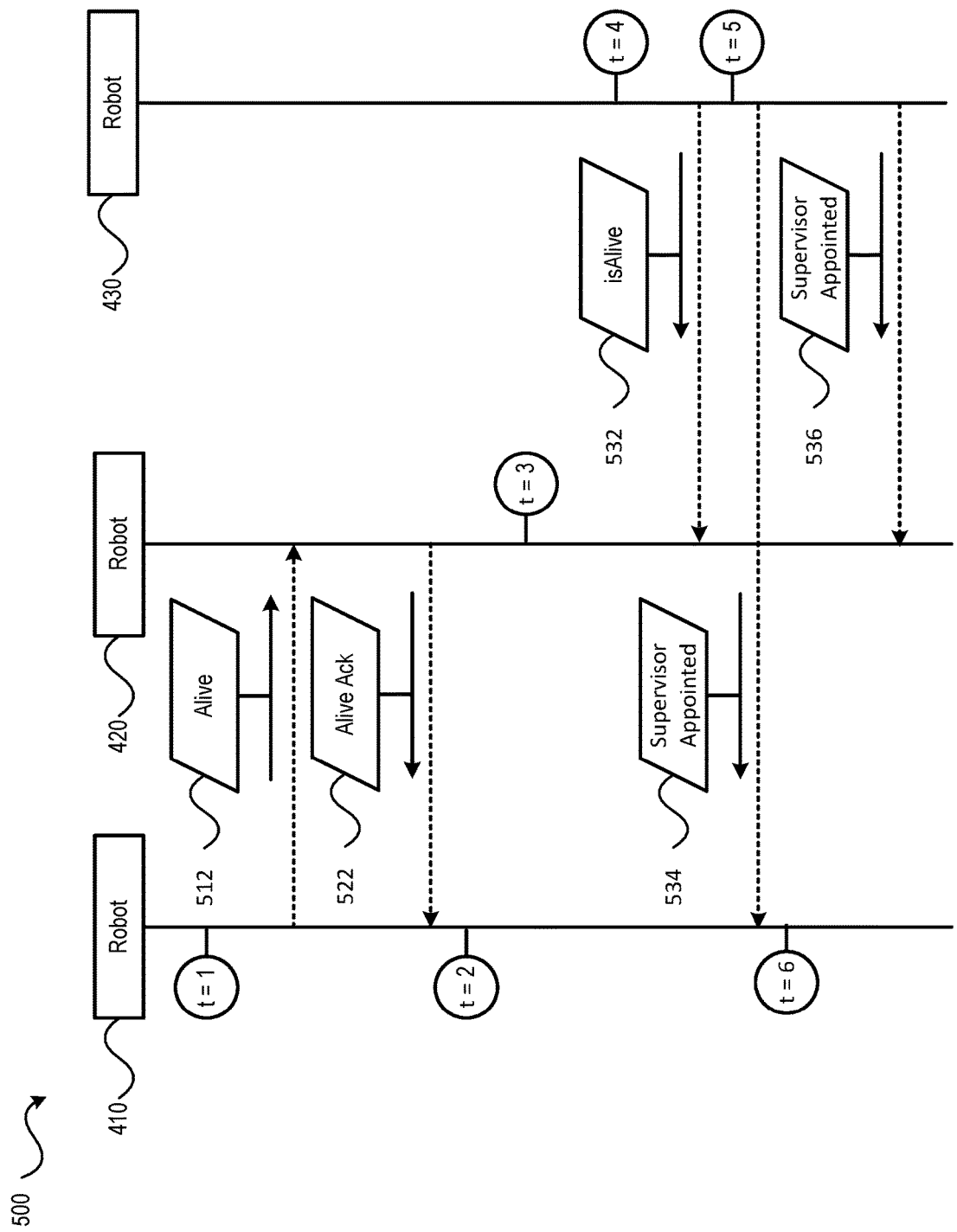
FIG. 5 is a ladder diagram illustrating an exemplary process for selecting supervisor and worker roles for the set of tasks in accordance with embodiments of the present disclosure.

Robots may periodically verify that the supervisor is alive. For example, and referring to FIG. 5, a ladder diagram illustrating an exemplary process for selecting supervisor and worker roles for the set of tasks is shown as a process 500. In FIG. 5, the robots 410, 420, 430 of FIG. 4 are shown. In the illustrative example of FIG. 5, the robot 420 may be supervising a task, such as the task assigned to robot 410 described above with reference to FIG. 4. The robot 420 may have become the supervisor of the task as described above with reference to FIG. 1. The other robots (e.g., robots 410, 430) may periodically check on the status of the supervisor (e.g., robot 420). For example, at a first time (t=1), the robot 410 may transmit an alive message 512 to the robot 420 to verify that the robot 420 is still operational. In an aspect, the alive message 512 may be transmitted when the patience timer of the robot 410 expires. Upon receiving the alive message 512, the supervisor robot 420 may transmit an alive acknowledgement message 522 to the robot 410, which may signify that the supervisor is still operational and functioning properly. The alive acknowledgement message 522 may be received by the robot 410 at a time (t=2) and the robot 410 may reset its patience timer upon receiving the alive acknowledgement message 522.

Subsequent to transmitting the alive acknowledgement messages 522, the supervisor robot 420 may fail at time (t=3). The patience timer of the robot 430 may expire at a time (t=4), which may cause the robot 430 to transmit an alive message 532 to the robot 420. However, since the robot 420 has failed, the robot 430 may not receive an alive acknowledgement message. When the robot 430 does not receive an alive acknowledgement message from the robot 420 in response to the alive message 532, the robot 430 may determine to take over the supervisor role from the robot 420, at a time (t=5). Upon determining to take over the supervisor role from the robot 420, the robot 430 may transmit a supervisor appointed message 534 to the robot 410 and a supervisor appointed message 536 to the robot 420. When the robot 410 receives the supervisor appointment message 534 it may reset its patience timer, at time (t=6).

Referring back to FIG. 1, the above-described functionality provided by robots in accordance with aspects of the present disclosure may increase the fault tolerance of the system 100 and enable the fleet of robots 110 to respond to outlier conditions and failures that may occur as the fleet of robots 110 work to perform the set of tasks. In addition to the fault tolerance provided by the processes 400, 500, the fleet of robots 110 may also provide additional capabilities to coordinate assignment of distributed tasks and roles among the fleet. For example, a supervisor may lose contact with a robot assigned to perform a task. The loss of contact may be detected based on failure to respond to an alive message used by the supervisor to monitor the status of tasks, as described above with reference to FIG. 4 or via other techniques (e.g., another robot may discover that a worker has failed and may periodically transmit a message to neighboring robots to indicate that a failed robot has been detected). The processes 400 and 500 described above allow the fleet of robots 110 to allocate responsibility for each task of the initial set of tasks to a robot of the fleet such that all tasks are assigned to a robot and each task is supervised by a different robot than the robot that is performing the task.

In addition to assigning responsibilities for performing or supervising the initial set of tasks, robots may create new tasks that were not included in the initial set of tasks configured for the fleet of robots 110. For example, a robot may detect that it cannot communicate with another robot that is performing a task that the robot is supervising. The robot may create a new task requesting that a robot check on the status of the worker robot and report back to the supervisor and the new task may be assigned using the process 400 of FIG. 4. Alternatively, the robot may simply create a task available message and broadcast the message to nearby robots, effectively recruiting a second robot to perform the task. While this may appear inefficient on its face since the new robot and the old robot may both end up performing the same task, it may only be minimally inefficient or not inefficient at all considering that the task may be more likely to be completed in a quick manner when taking into account events such as robots failing. In the former scenario where a robot is recruited to verify the status of the working robot it may take some time for that robot to locate the worker robot and if the robot has failed, the new robot may never discover the status of the robot, which could create substantial delays before the supervisor discovers the status of the task and could result in another robot needing to be recruited to perform the task (e.g., in the event the robot failed). Tasks may also be created to recruit additional robots to perform a task. For example, suppose that an available task requires the fleet of robots 110 to move an object from a point of origin to a destination and that a robot possessing the capabilities to move the object is assigned the worker role. When that robot attempts to perform the task it may discover that the object is too heavy to move or that there is another obstacle in its path that is preventing the robot from performing the task. Upon such a discovery, the robot could create a new task seeking another robot to assist with performance of the task of moving the object from the point of origin to the destination or removing the obstacle, or could seek to reassign the task to a new robot that is more powerful and can move the object and/or the obstacle. Once a second robot is found, the two robots may work together in a coordinated manner to complete the task or the second robot could take over the task and free up the robot to accept another task.

In an aspect, the robots may operate according to a set of principles or limitations on the quantity of tasks that they may perform or supervise. For example, each robot may be limited to accepting the worker role for a single task at a time but may supervise multiple tasks at the same time. Limiting robots to operating as workers for only one task at a time may ensure that as many robots are performing tasks as possible and minimize the number of idle robots. Allowing robots to accept the worker role for more than one task may be efficient in certain situations, such as when two tasks are to be performed in a specific sequence and at the same location since the robot could start the second task immediately (or very quickly) after the first task is completed, but may result in some robots sitting idle if the fleet of robots 110 includes a large number of robots. While allowing robots to only perform one task at a time may be a constraint imposed on the fleet of robots 110, the robots may supervisor of multiple tasks at the same time. This is because the supervisor role may have a minimal impact on the ability of the robots to complete the tasks or create delays in completion of the tasks.

In aspects, supervisor robots may classify worker proposals based on task priority. As an example, tasks having a first priority may be appointed to the first robot answering a task available message having a motivation higher than the minimum motivation score, which may be defined for the advertised task. The supervisor may wait a short time for better candidates (i.e., higher motivation scores) for lower priority tasks and select the most suited robot based on received motivations at the end of the waiting period. Accepting the first robot having a qualifying motivation score (e.g., a score satisfying the minimum motivation score) for higher priority tasks may allow those tasks to be assigned quickly and ensure that those tasks are performed as quickly as possible while allowing time to find the best available candidate for lower priority tasks may ensure that tasks are assigned to robots that are best suited to perform the task. It is noted that while two different priority classes have been described above, embodiments are not limited to utilizing two priority classes. Instead, any number of priority classes may be utilized according to the particular configuration of the system 100 and the types of tasks that are to be performed by the fleet of robots 110. Additionally, a supervisor may be configured to ignore motivation scores that are deemed "too good to be true" when determining worker appointments. For example, the motivation scores may be indexed based on battery level and cannot stay nominal over time for a robot. This may serve as a protection against arbitrary behaviors by the fleet of robots 110. To illustrate, in actual practice it is almost impossible for a robot to have a perfect motivation score because the score is calculated based on dynamic parameters, some of which may decay over time (e.g., battery levels). Configuring robots with logic to detect such arbitrary behaviors by other robots may enable supervisors of tasks for the fleet of robots 110 to avoid allocation of tasks to robots exhibiting such arbitrary behaviors, which may reduce the likelihood that robot tasks are negatively impacted by robots exhibiting arbitrary behaviors. In an aspect, a supervisor may record information indicating potential errors with respect to robots exhibiting arbitrary behaviors. For example, when a robot transmits a message having a motivation score that is too good to be true, the robot identity, motivation score, or other information may be recorded to the one or more databases 130. A user operating the user device 120 may be able to review an error log of detected arbitrary behaviors and take those robots out of the fleet of robots 110 (e.g., for service, diagnostics, etc.).

In some aspects the fleet of robots 110 may be configured to perform idle functions that may not require worker appointment or supervision. The particular idle functions each robot performs may be configured on a per-use case basis. The idle functions may include tasks that are useful to the system and may allow every robot to contribute to the efficient operation of the system 100 when they do not have a supervised task to perform. As an example, a robot may be configured to perform communication relay tasks when idle. The communication relay tasks may include using peer-to-peer or other communication techniques to expand the communication capabilities of the fleet of robots 110. For example, it may be known that a particular location at the site of interest 150 has particularly bad communication coverage and so an idle robot may be configured to travel to the particular location (or an edge of the particular location) and monitor for transmissions that may then be received by the idle robot and retransmitted (e.g., via a broadcast or other transmission technique) in order to allow robots operating within locations having poor communication coverage to communicate with remote robots operating at the site of interest 150. It is noted that the exemplary idle tasks described above have been provided for purposes of illustration, rather than by way of limitation and that robots of embodiments may be configured to perform additional idle tasks designed to provide utility to the system 100. Additionally, the fleet of robots 110 may be configured with a recovery mode behavior that the robots are to perform in case a robot becomes disconnected from the rest of the fleet for a prolonged period of time. For example, the recovery mode behavior may specify that the robots are to return to a particular location when communication is lost from the fleet of robots 110 for the period of time. The location may be the one or more docking stations 118, a location where the robot last had communication with the fleet of robots 110, or another location.

As described above with reference to FIGS. 4 and 5, the robots may be configured to transmit various types of messages during coordination of task assignments. Exemplary messages that the robots may transmit are shown in Table 1 below.

| Name | Type | Acknowledgement |
| --- | --- | --- |
| Alive (ping) | Request-respond (1) | yes |
| New Task Created | Broadcast (n) | no |
| Task Supervisor Appointed | Broadcast (n) | no |
| Task Worker Appointed | Request-respond (1) | yes |
| Task Available | Broadcast (m) | no |
| Worker Proposal | Request-respond (1) | yes |

As shown in Table 1, above, some message types may be unicast, such as the alive message, the task worker appointed message, and the worker proposal message, while other messages may be broadcast to multiple robots. In some aspects, broadcasted messages may be broadcast to all N robots of the fleet of robots, such as the new task created message and the task supervisor appointed message, while other broadcasted messages may be addressed to a subset (M) of the fleet of robots, where M<N. Additionally, Table 1 illustrates that some messages may require an acknowledgement from the message recipients, such as the alive message, the task worker appointed message, and the worker proposal message, while the other messages may not require acknowledgement. It is noted that the exemplary messages illustrated in Table 1 and their characteristics (e.g., unicast, broadcast, acknowledgement requirements, etc.) are provided for purposes of illustration, rather than by way of limitation and that other messages, message characteristics, and transmission types may be used in accordance with the concepts disclosed herein and the requirements of the fleet of robots 110.

In addition to the behaviors described above for performing tasks, assigning tasks, and supervising tasks, the robots of embodiments may be configured with other behaviors. For example, the robots may be configured to perform various tasks or behaviors when docked at the one or more docking stations 118 or when idle. Exemplary behaviors that the robots of embodiments may perform when docked or idle may include: Running internal diagnostics; looking for software and hardware inconsistencies which could require human action (e.g., replacement, repair, upgrade, etc.); running sanity checks on the robot's clock(s) (e.g., to maintain fleet synchronization) and robot beliefs (e.g., the robot's understanding of the state of the set of tasks and the other robots in the fleet of robots 110); declaring dead and unresponsive robots in the fleet of robots 110, which may include notifying a user via communications with the user device 120 using an network-connected edge system (e.g., a system available at the one or more docking stations or other location at the site of interest where network connectivity is available); uploading files to an external system, such as the electronic device 160, the user device 120, the one or more databases 130, another device, or a combination of different devices; and downloading new tasks.

As shown above, the idle and docking behaviors of the fleet of robots 110 may allow the robots to perform various independent tasks (i.e., tasks that do not require supervision by another robot) to maintain themselves in good working order, deliver information or files generated during performance of tasks, or other types of actions when not assigned to perform tasks. As an example of delivering information generated during performance of tasks, a robot may accept a worker role for a task that requires the robot to map or scan a location using an RGB-D camera. During performance of the task the robot may generate a point cloud based on the scanning of the location using the RGB-D camera. The point cloud may approximate manual scanning with respect to accuracy or precision despite being performed by a robot. The point cloud may be stored in a file that may be large in size and may require network connectivity that is not available at the location where the scanning occurred. During the robot's idle time or when the robot needs to recharge or refuel, the idle mode or docking behaviors may cause the robot to return to the one or more docking stations 118 in order to provide the point cloud file information to a remote device (e.g., the electronic device 160, the user device 120, the one or more databases 130, another device, or a combination of different devices) or may travel to a location where connectivity to the one or more networks 140 is available so that the information may be provided to the remote device(s).

The concepts described above with reference to FIGS. 1-4 overcome many of the challenges faced by existing systems. For example, highly disruptive scenarios create problems in existing systems and result in inefficient operation of the robots and completion of the tasks. Exemplary issues that may disrupt such systems may include: task supervisors dying or becoming unresponsive after appointing the task to another robot; supervisors and workers dying during the task execution; and task supervisors not receiving any proposals after broadcasting a "task available" message. As shown above, the system 100 of FIG. 1 is fully capable of handling such disruptive behaviors. For example, as illustrated in FIG. 5, when a supervisor dies, a robot that attempted to become the supervisor may periodically transmit an alive message to the supervisor and if no response is received may assume the supervisor role, thereby allowing supervision of the task to continue despite the failure of the robot originally supervising the task. Additionally, workers and supervisor may periodically transmit alive messages during performance of the task to verify that the pair of robots are still operating, thereby allowing the fleet of robots 110 to identify failed workers and supervisors during performance of tasks. Additionally, when no task proposal messages are received, the supervisor robots may transmit new task available messages which may be received by robots that have moved into range of the supervisor since the original task available message was transmitted. The above-described capabilities allow the fleet of robots 110 to overcome the challenges that hinder existing systems.

Another problem for existing systems is arbitrary robot behaviors, which may include: A robot claiming minimum patience and maximum motivation on all tasks and not proposing new tasks. As shown above, the fleet of robots 110 may be configured to identify when these behaviors occur and mitigate their impact on the operations of the system 100. For example, maximum motivation scores may be identified as motivation scores that are "too good to be true" and detected as outlier scores, which may be discarded. Thus, robot behaviors that create problematic scenarios in existing systems may be mitigated by the fleet of robots 110 and allow the system 100 to operate smoothly despite the presence of such behaviors.

From the description of FIGS. 1-5 above, it should be understood that the messaging flows and logic utilized by the fleet of robots 110 to determine when and how to transmit messages (i.e., broadcast or unicast, send a response or a response is not required, etc.) associated with assignment of tasks enable the fleet of robots 110 to perform and supervise tasks in a distributed and coordinated manner that overcomes many of the behaviors that create problems in existing systems. Moreover, the system 100 enables the robots to perform tasks in low connectivity environments where centralized control systems are not viable solutions. It is noted that the communications between robots of embodiments may be facilitated via short range communications, such as Bluetooth, peer-to-peer communication protocols, and the like, thereby allowing the robots to overcome the lack of a widespread network communication capability. Moreover, it is noted that low connectivity environments do not necessarily mean that network communication infrastructure such as cellular communication or other types of wired and wireless networks cannot be present—rather, such network capabilities are not readily accessible to facilitate communication to the entire fleet. For example, a building may have areas where a cellular communication or other wireless network cannot be accessed due to interference caused by the infrastructure of the building or for other reasons, thereby cutting robots operating within those areas from those communication capabilities with respect to communication with other robots in the fleet. The tasks that may be performed by the fleet of robots 110 may include a diverse number of tasks and may be performed using many different types of robots, each having different sets of capabilities.

Figure 6:
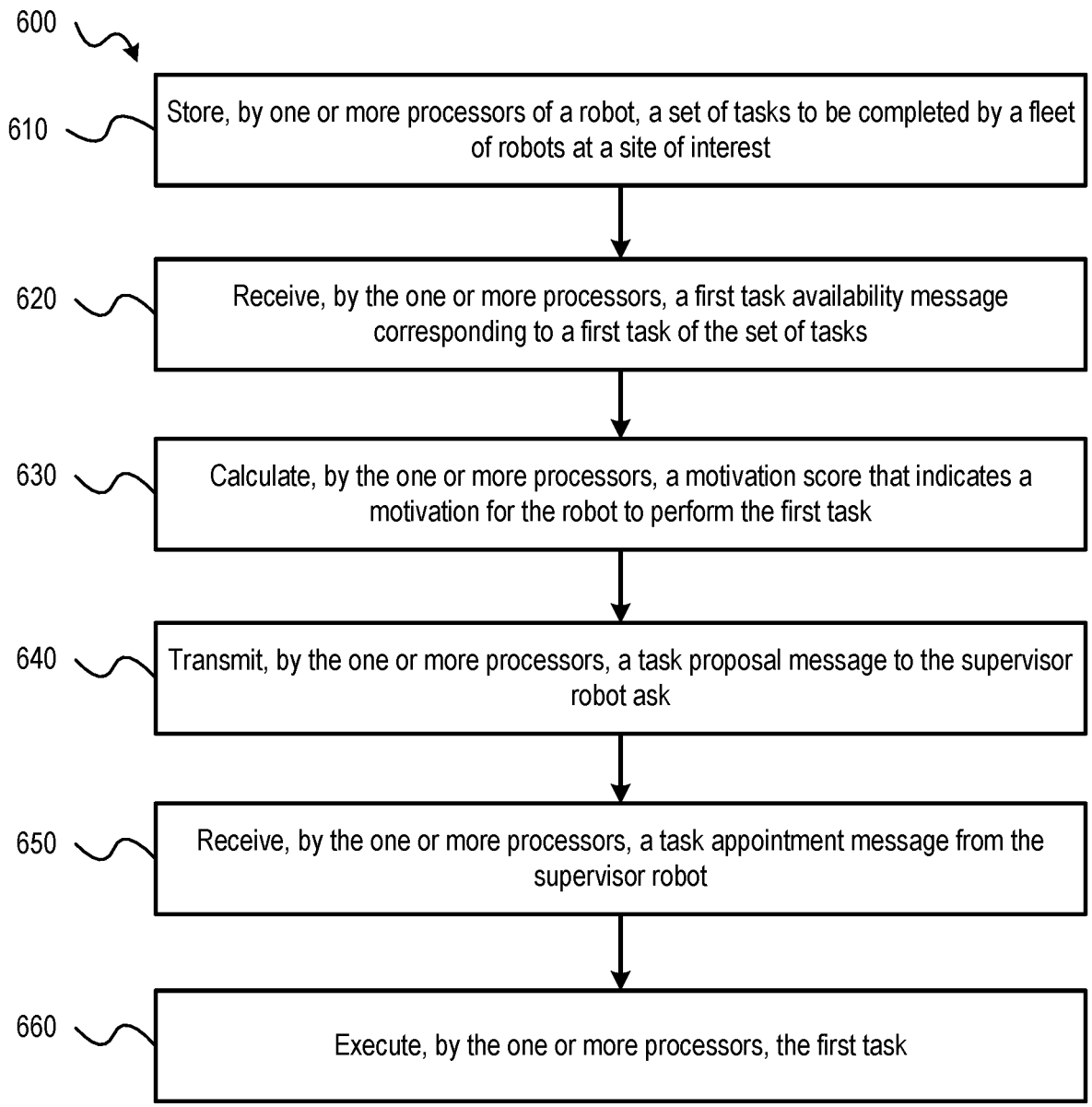
FIG. 6 is a flow diagram of an exemplary process for distributed coordination and performance of robotic tasks in accordance with embodiments of the present disclosure.

Referring to FIG. 6, a flow diagram of an exemplary process for distributed coordination and performance of robotic tasks in accordance with embodiments of the present disclosure is shown as a method 600. It is noted that aspects of the method 600 may be performed by a robot, such as the robot 200 of FIG. 2, and steps of the method 600 may be stored as instructions (e.g., the instructions 222 of FIG. 2)

that may be executed by one or more processors (e.g., the one or more processors 210 of FIG. 2) to perform the steps of the method 600. In aspects, robots performing the method 600 may be operating as part of a system, such as the system 100 of FIG. 1.

As shown in FIG. 6, the method 600 may include, at step 610, storing, by one or more processors of a robot, a set of tasks to be completed by a fleet of robots at a site of interest. As described above, the robot may be one of a plurality of robots included in the fleet of robots (e.g., the fleet of robots 110 of FIG. 1). At step 620, the method 600 includes receiving, by the one or more processors, a first task availability message corresponding to a first task of the set of tasks. In an aspect, the task availability message may be received as described above with reference to FIG. 4 and may be received from a supervisor robot acting as a supervisor for the first task.

At step 630, the method 600 includes calculating, by the one or more processors, a motivation score that indicates a motivation for the robot to perform the first task. As described above, the motivation score may be calculated, at least in part, based on a specification associated with the first task and one or more capabilities of the robot. It is noted that the motivation score may also be calculated based on other factors as described herein, such as proximity of the robot to a geographic location associated with the first task, whether the robot is already assigned to perform a second task, a number of tasks for which the robot is allowed to hold a worker roll simultaneously, and the like. At step 640, the method 600 includes transmitting, by the one or more processors, a task proposal message to the supervisor robot. The task proposal message may include the motivation score, as described above with reference to FIG. 4.

At step 650, the method 600 includes receiving, by the one or more processors, a task appointment message from the supervisor robot. As described above with reference to FIG. 4, the task appointment message may indicate the robot is assigned to perform the first task by the supervisor robot. The robot may be selected to perform the first task based on the motivation score included in the task proposal transmitted by the robot, such as when the robot has the highest motivation score or based on other factors as described herein. Subsequent to designation of the robot to perform the first task, the method 600 may include, at step 660, executing, by the one or more processors, the first task.

In an aspect, the method 600 may also include operations to receive an alive message from the supervisor robot, and transmit an alive acknowledgement message to the supervisor robot in response to receiving the alive message. As explained above, the sequence of alive and alive acknowledgement messages may facilitate monitoring the performance of tasks and allow the supervisor to verify the status of robots performing tasks. For example, the alive acknowledgement message may include information associated with a status of the first task, a status of the robot, or both. In an aspect, the method 600 may also include operations to verify the status of supervisor robots of a fleet of robots. For example, the robot performing the first task may transmit an alive message to a second supervisor robot of a second task. The alive message transmitted to the second supervisor robot may allow the robot to ensure that the second supervisor robot has not failed. After sending the alive message to the second supervisor robot, the robot may determine a status of a patience timer corresponding to the second task and then determine to take over or not take over as the supervisor robot of the second task based on the status of the patience timer and whether an acknowledgement of the alive message transmitted to the supervisor robot of the second task is received. The patience timer may be configured to track a defined period of time (e.g., 30 seconds, 1 minute, 5 minutes, or another unit of time) and may be used to determine whether other robots are alive. For example, where the acknowledgement of the alive message is received prior to expiration of the patience timer, the robot may simply reset the patience timer and continue to monitor the status of the second supervisor robot.

Where the patience timer has expired and the acknowledgement of the alive message has not been received, the robot may transmit a supervisor appointed message to at least a portion of the fleet of robots (e.g., a portion of the fleet that is within communication range of the robot). The supervisor appointed message may indicate the robot is attempting to take over as the supervisor robot of the second task. In an aspect, the supervisor appointed message may include a motivation score indicating a motivation of the robot to become the supervisor robot of the second task. The robot may determine whether supervisor appointed messages have been received from other robots of the fleet of robots and selectively take over as the supervisor of the second task based on the motivation score indicating the motivation of the robot to become the supervisor of the second task and motivation scores included in any supervisor appointed messages received from the other robots, as described above with reference to FIG. 5.

In some aspects, the method 600 may include detecting a predetermined condition and executing a preprogrammed behavior configured to resolve the predetermined condition. For example, the predetermined condition may include a loss of communication with the fleet of robots, generation of a file for uploading to an external device (e.g., a point cloud, a set of images, a video, a set of measurements, etc.), a low power condition, and the like. The preprogrammed behavior may include navigating to a predetermined location, reestablishing communication with at least one robot of the fleet of robots, returning to a docking station, uploading the file to the external device, or other actions, as described herein.

Figure 7:
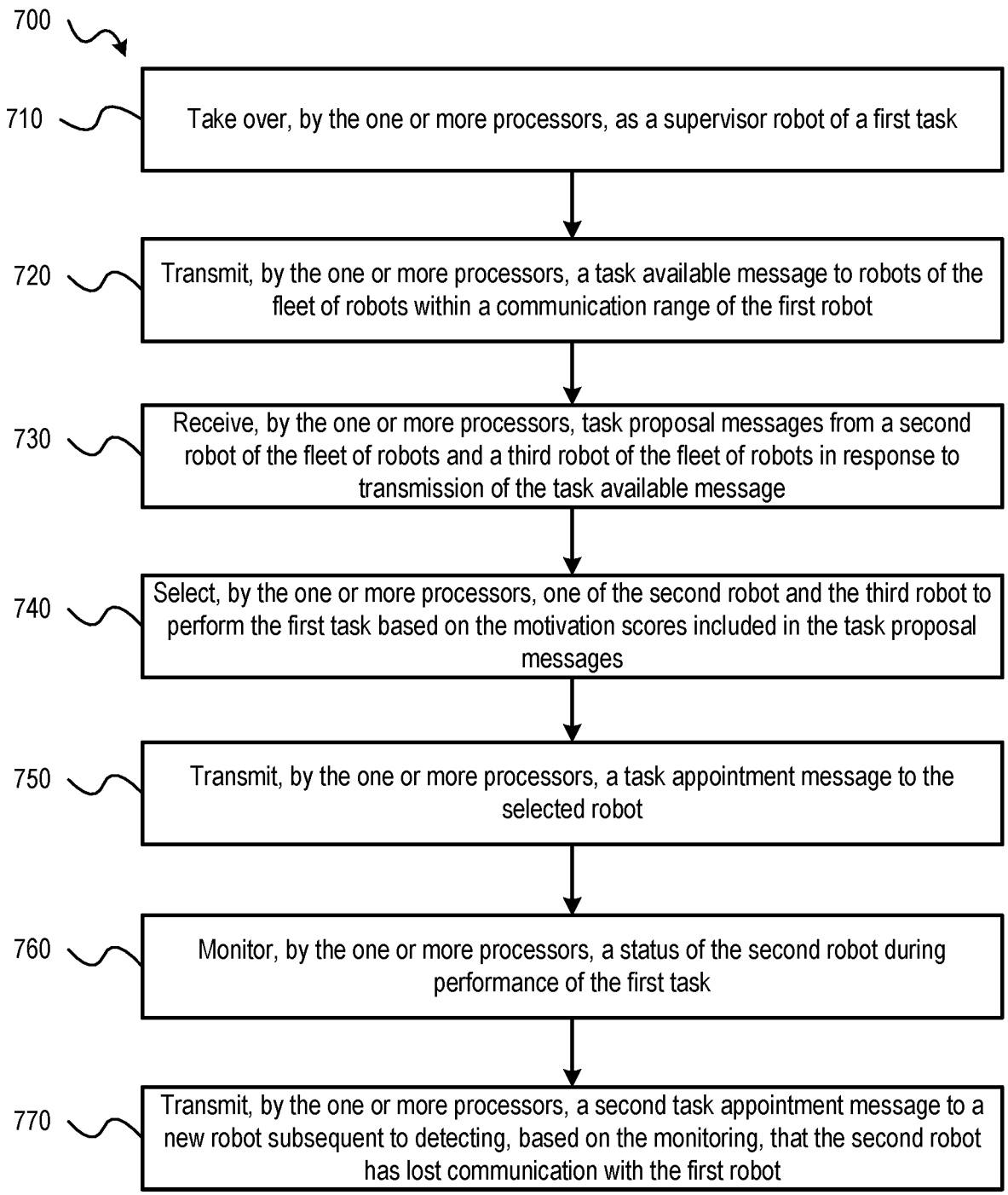
FIG. 7 is a flow diagram of an exemplary process for distributed coordination and supervision of robotic tasks in accordance with embodiments of the present disclosure.

Referring to FIG. 7, a flow diagram of an exemplary process for distributed coordination and supervision of robotic tasks in accordance with embodiments of the present disclosure is shown as a method 700. It is noted that aspects of the method 700 may be performed by a robot, such as the robot 200 of FIG. 2, and steps of the method 700 may be stored as instructions (e.g., the instructions 222 of FIG. 2) that may be executed by one or more processors (e.g., the one or more processors 210 of FIG. 2) to perform the steps of the method 700. In aspects, robots performing the method 700 may be operating as part of a system, such as the system 100 of FIG. 1.

At step 710, the method 700 includes taking over, by one or more processors of a first robot, as a supervisor robot of a first task. In an aspect, the taking over may be accomplished by exchanging a sequence of supervisor appointed messages with zero or more other robots of the fleet of robots, as described above. Upon taking over the role of supervisor, the method 700 includes, at step 720, transmitting, by the one or more processors, a task available message to robots of the fleet of robots within a communication range of the first robot. The method 700 includes, at 730, receiving, by the one or more processors, task proposal messages from a second robot of the fleet of robots and a third robot of the fleet of robots in response to transmission of the task available message. As described above with reference to FIG. 4, the task proposal messages may include motivation scores for the second robot and the third robot that indicate a motivation of each of the second and third robots to perform a first task corresponding to the task available message.

At step 740, the method 700 includes selecting, by the one or more processors, one of the second robot and the third robot to perform the first task based on the motivation scores included in the task proposal messages. In an aspect, the selected robot may be determined based on a priority factor, as described above, such as to select a first robot having a motivation score satisfying a threshold score or waiting for a period of time and selecting a robot having a highest motivation score. At step 750, the method 700 includes transmitting, by the one or more processors, a task appointment message to the selected robot. The task appointment message may designate the selected robot to perform the first task, as described above with reference to FIG. 4. At step 760, the method 700 includes monitoring, by the one or more processors, a status of the second robot during performance of the first task and, at step 770, transmitting, by the one or more processors, a second task appointment message to a new robot subsequent to detecting, based on the monitoring, that the selected robot has lost communication with the first robot. As described above with reference to FIGS. 1 and 4, when a supervisor robot cannot communicate with a robot appointed to perform a task, the supervisor may select a new robot to perform the task previously assigned to the robot for which communication has been lost. This enables the fleet of robots to perform tasks more efficiently by detecting potential robot failures based on loss of communication with robots performing tasks and then assigning tasks assigned to the lost robots to new robots. While such processes may result in tasks being performed multiple times it also allows the fleet of robots to more effectively respond to arbitrary behaviors and outlier conditions that result in inefficiencies in existing systems, as described above.

The method 700 may also include additional operations. For example, the supervisor robot associated with the method 700 may also perform operations in accordance with the method 600 (e.g., because the supervisor robot of the method 700 may also be a worker with respect to a different task). The method 700 may also include periodic transmission of an alive message to the selected robot to monitor a status of the first task and a determination of whether an alive acknowledgement is received in response to the alive message. The method 700 may also include transmit a second task available message in response to detection that an alive message acknowledgement has not been received subsequent to transmission of the alive message. The second task available message may be configured to solicit additional task proposals from robots other than the second robot associated with performing the second task. For example, if a received task proposal is received with a score that does not satisfy a threshold score for task assignment by the supervisor or an abnormally high score (e.g., a too good to be true score) is received, the supervisor robot operating in accordance with the method 700 may wait for additional task proposals from other robots or retransmit the task available message to attempt to receive task proposals from other robots, as described above. In aspects, the robots operating in accordance with the method 600 and 700 may create new tasks (e.g., during execution of a set of tasks). The new tasks may be assigned to a robot of the fleet of robots, as described above with reference to FIGS. 1, 4, 6, and 7.

As shown above, the methods 600 and 700 enable systems involving a fleet of robots performing tasks in a distributed and coordinated manner to overcome many of the challenges faced by existing systems. For example, highly disruptive scenarios create problems in existing systems and result in inefficient operation of the robots and completion of the tasks. Exemplary issues that may disrupt such systems may include: task supervisors dying or becoming unresponsive after appointing the task to another robot; supervisors and workers dying during the task execution; and task supervisors not receiving any proposals after broadcasting a "task available" message. As shown above, the methods 600 and 700 handle such disruptive behaviors using a sequence of message exchanges that allow failed robots to be detected, tasks associated with failed robots reassigned, and other operations that prevent tasks from not being completed or other inefficiencies. Additionally, the methods 600 and 700 solve problems associated with arbitrary robot behaviors, which may include: a robot claiming minimum patience and maximum motivation on all tasks and not proposing new tasks. As shown above, the fleet of robots 110 may be configured to identify when these behaviors occur and mitigate their impact on the operations of the system 100. For example, when evaluating supervisor motivation scores and worker motivation scores maximum motivation scores may be identified as motivation scores that are "too good to be true" and detected as outlier scores, which may be discarded or ignored. Thus, robot behaviors of that create problematic scenarios in existing systems may be mitigated by a fleet of robots when operating in accordance with the methods 600 and 700 and the concepts disclosed herein. It is noted that the terms "alive message" and "acknowledgement message" have been described as being transmitted by supervisor robots and worker robots. Alive messages may be referred to as "worker alive messages" when transmitted from a supervisor to a worker to verify the status of the worker and may be referred to as "supervisor alive messages" when transmitted from a worker to a supervisor to verify the status of the supervisor. Similarly, alive acknowledgement messages may be referred to as "worker acknowledgement messages" when transmitted by workers to acknowledge an alive message (e.g., a worker alive message) transmitted by a supervisor and "supervisor acknowledgement messages" when transmitted by supervisors to acknowledge an alive message (e.g., a supervisor alive message) transmitted by a worker.

Although the embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method comprising:
   storing, by one or more processors of a robot, a set of tasks to be completed by a fleet of robots at a site of interest, wherein the robot is one of a plurality of robots included in the fleet of robots;
   receiving, by the one or more processors, a first task availability message corresponding to a first task of the set of tasks, wherein the first task availability message is received from a supervisor robot for the first task, wherein each robot in the fleet of robots is operable as both a worker for performing tasks of the set of tasks and a supervisor for supervising performance of other tasks of the set of tasks by other robots in the fleet, and wherein the supervisor for each task of the set of tasks is selected dynamically based on an exchange of messages between the plurality of robots included in the fleet of robots;
   calculating, by the one or more processors, a motivation score that indicates a motivation for the robot to perform the first task, wherein the motivation score is calculated, at least in part, based on a specification associated with the first task and one or more capabilities of the robot to perform the first task;
   transmitting, by the one or more processors, a task proposal message to the supervisor robot for the first task based on the motivation score;
   receiving, by the one or more processors, a task appointment message from the supervisor robot for the first task, wherein the task appointment message indicates the robot is assigned to perform the first task by the supervisor robot;
   executing, by the one or more processors, the first task;
   transmitting, by the one or more processors, a supervisor alive message to the supervisor robot for the first task during execution of the first task to verify that the supervisor robot is operational;
   determining, by the one or more processors, to take over as supervisor of the first task in response to the expiration of a patience timer; and
   transmitting, by the one or more processors, a supervisor appointed message to at least a portion of the fleet of robots, wherein the supervisor appointed message indicates that the robot is attempting to take over as the supervisor of the first task.

2. The method of claim 1, wherein the motivation score is further calculated based on a geographic proximity of the robot to a location associated with the first task.

3. The method of claim 1, further comprising:
   receiving a worker alive message from the supervisor robot; and
   transmitting a worker acknowledgement message to the supervisor robot in response to receiving the alive message.

4. The method of claim 3, wherein the worker acknowledgement message comprises information associated with a status of the first task, a status of the robot, or both.

5. The method of claim 1, wherein the supervisor appointed message comprises the motivation score of the robot for the first task, the method further comprising:
   determining whether supervisor appointed messages have been received from other robots of the fleet of robots; and
   selectively taking over as the supervisor of the first task based on the motivation score and motivation scores included in any supervisor appointed messages received from the other robots,
   wherein the robot takes over as the supervisor of the first task when the robot has a highest motivation score relative to the other robots.

6. The method of claim 1, further comprising:
   detecting a predetermined condition; and
   executing a preprogrammed behavior configured to resolve the predetermined condition.

7. The method of claim 6, wherein the predetermined condition comprises a loss of communication with the fleet of robots, generation of a file for uploading to an external device, or a low power condition, wherein the preprogrammed behavior comprises: navigating to a predetermined location, reestablishing communication with at least one robot of the fleet of robots, returning to a docking station, and uploading the file to the external device.

8. The method of claim 1, wherein the supervisor robot is selected based on (i) a probability of the robot included in the fleet of robots becoming the supervisor of the first task and (ii) a minimum time before the robot tries to become the supervisor of the first task.

9. A system comprising:
   a first robot of a fleet of robots, the first robot comprising:
      a memory;
      a motion and propulsion control system configured to control movement of the first robot; and
      one or more processors communicatively coupled to the memory, and the motion and propulsion control system, the one or more processors configured to:
         take over as a supervisor robot of a first task of a set of tasks, wherein each robot in the fleet of robots is operable as both a worker for performing tasks of the set of tasks and a supervisor for supervising performance of other tasks of the set of tasks by other robots in the fleet, and wherein the supervisor of each task in the set of tasks is selected dynamically based on an exchange of messages between the robots included in the fleet of robots, and;
         transmit a task available message to other robots of the fleet of robots within a communication range of the first robot;
         receive task proposal messages from a second robot of the fleet of robots and a third robot of the fleet of robots in response to transmission of the task available message,
            wherein the task proposal messages comprise motivation scores for the second robot and the third robot that indicate a motivation of each of the robots to perform a first task corresponding to the task available message;
         select one of the second robot and the third robot to perform the first task based on the motivation scores included in the task proposal messages;
         transmit a task appointment message to the selected robot,
            wherein the task appointment message designates the selected robot to perform the first task;
         monitor a status of the second robot during performance of the first task;
         transmit a second task appointment message to a new robot subsequent to detecting, based on the monitoring, that the second robot has lost communication with the first robot,
            wherein the second task appointment message designates the new robot to perform the first task;

receive, from the new robot, a supervisor alive message; and transmit, to the new robot, a supervisor acknowledgment message.

10. The system of claim 9, wherein the monitoring comprises periodic transmission of a worker alive message to the selected robot to monitor a status of the first task and a determination of whether a worker alive acknowledgement is received in response to the worker alive message, the one or more processors configured to transmit a second task available message in response to detection that the worker alive message acknowledgement has not been received subsequent to transmission of the alive message, and wherein the second task available message is configured to solicit additional task proposals from robots other than the second robot associated with performing the second task.

11. The system of claim 9, wherein the first robot is a supervisor robot of a second task.

12. The system of claim 9, wherein the first robot is configured to perform a third task.

13. The system of claim 9, wherein selection of one of the second robot and the third robot to perform the first task based on the motivation scores included in the task proposal messages is based on a priority factor, and wherein the priority factor indicates the first task is to be assigned to a robot that sent an earliest in time task proposal message that includes a motivation score satisfying a threshold motivation score.

14. The system of claim 9, wherein the one or more processors are configured to delay selection of one of the second robot and the third robot for a period of time based on a priority of the first task, wherein the period of time is configured to afford the other robots time to transmit task proposals for the first task such that a robot in the fleet of robots having a highest motivation score for the first task is selected to perform the first task.

15. The system of claim 9, wherein the one or more processors are configured to:

create a new task during execution of a set of task; and assign the new task to a particular robot of the fleet of robots.

16. A non-transitory computer-readable storage medium storing instructions that, when executed by one or more processors, cause the one or more processors to perform operations comprising:

storing a set of tasks to be completed by a fleet of robots at a site of interest, wherein the set of tasks are stored at a memory of a robot of the fleet of robots, and wherein the robot is one of a plurality of robots included in the fleet of robots;

receiving a first task availability message corresponding to a first task of the set of tasks, wherein the first task availability message is received from a robot acting as a supervisor robot for the first task, wherein each robot in the fleet of robots is operable as both a worker for performing tasks of the set of tasks and a supervisor for supervising performance of other tasks of the set of tasks by other robots in the fleet, and wherein the supervisor of each task of the set of tasks is selected dynamically based on an exchange of messages between the plurality of robots included in the fleet of robots, and;

calculating a motivation score that indicates a motivation for the robot to perform the first task, wherein the motivation score is calculated, at least in part, based on a specification associated with the first task and one or more capabilities of the robot to perform the first task;

transmitting a task proposal message to the supervisor robot of the first task based on the motivation score;

receiving a task appointment message from the supervisor robot of the first task, wherein the task appointment message indicates the robot is assigned to perform the first task by the supervisor robot;

executing the first task;

transmitting, by the one or more processors, a supervisor alive message to the supervisor robot for the first task during execution of the first task to verify that the supervisor robot is operational;

determining, by the one or more processors, to take over as supervisor of the first task in response to the expiration of a patience timer; and transmitting, by the one or more processors, a supervisor appointed message to at least a portion of the fleet of robots, wherein the supervisor appointed message indicates that the robot is attempting to take over as the supervisor of the first task.

17. The non-transitory computer-readable storage medium of claim 16, wherein the supervisor appointed message comprises the motivation score of the robot for the first task, the operations further comprising:

determining whether supervisor appointed messages have been received from other robots of the fleet of robots; and selectively taking over as the supervisor of the first task based on the second motivation score and motivation scores included in any supervisor appointed messages received from the other robots, wherein the robot takes over as the supervisor of the first task when the robot has a highest motivation score relative to the other robots.

* * * * *